(12) United States Patent
Saionji et al.

(10) Patent No.: US 7,744,141 B2
(45) Date of Patent: Jun. 29, 2010

(54) RETRACTABLE ASSIST HANDLE FOR A VEHICLE

(75) Inventors: Katsuhiro Saionji, Novi, MI (US); Saori Nakano, Toyota (JP); Masaya Koyama, Okazaki (JP); Toyoshi Nakamoto, Toyota (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 707 days.

(21) Appl. No.: 11/624,473

(22) Filed: Jan. 18, 2007

(65) Prior Publication Data

US 2008/0174145 A1 Jul. 24, 2008

(51) Int. Cl.
*B60N 3/02* (2006.01)
(52) U.S. Cl. ............................ 296/1.02; 16/429; 49/461
(58) Field of Classification Search ................. 296/1.02, 296/1.01, 152, 153, 146.9, 71; 49/460, 461; 16/110.1, 412, 413, 419, 420, 422, 426, 427, 16/429, 444, 446
See application file for complete search history.

(56) References Cited

U.S. PATENT DOCUMENTS

| | | | | | |
|---|---|---|---|---|---|
| 1,268,209 | A | * | 6/1918 | Brady | 105/461 |
| 1,405,309 | A | | 1/1922 | Matthews | |
| 2,111,059 | A | * | 3/1938 | Basel | 296/153 |
| 2,130,410 | A | * | 9/1938 | Basel | 296/153 |
| 2,274,892 | A | * | 3/1942 | Fox | 49/262 |
| 2,610,084 | A | * | 9/1952 | Anderson | 49/460 |
| 2,677,573 | A | * | 5/1954 | Anderson | 49/460 |
| 3,243,222 | A | * | 3/1966 | Loughary et al. | 49/460 |
| 4,626,016 | A | | 12/1986 | Bergsten | |
| 4,632,447 | A | * | 12/1986 | Nomura et al. | 296/153 |
| 4,679,806 | A | * | 7/1987 | Gingline | 280/47.38 |
| 5,104,169 | A | | 4/1992 | Kopnski | |
| 5,910,077 | A | * | 6/1999 | Aumiller et al. | 49/460 |
| 5,913,562 | A | | 6/1999 | Mattarella et al. | |
| 6,131,979 | A | | 10/2000 | McGhee | |
| 6,340,189 | B1 | | 1/2002 | Pordy | |
| 6,371,549 | B2 | * | 4/2002 | Kim | 296/146.8 |
| 6,533,346 | B2 | * | 3/2003 | Yu | 296/152 |
| 6,574,833 | B1 | * | 6/2003 | Tomaiuolo | 16/110.1 |
| 6,574,921 | B2 | * | 6/2003 | Zimmermann | 49/324 |
| 6,584,643 | B1 | * | 7/2003 | Tomaiuolo | 16/110.1 |
| 6,715,813 | B2 | | 4/2004 | Thompson et al. | |
| 6,799,353 | B1 | | 10/2004 | Stewart et al. | |
| 6,869,119 | B2 | | 3/2005 | Ito et al. | |
| 6,974,134 | B1 | | 12/2005 | Macri et al. | |
| 6,986,177 | B2 | | 1/2006 | Thaxton | |
| 7,144,067 | B2 | * | 12/2006 | Gramss | 296/153 |
| 7,194,840 | B2 | * | 3/2007 | Zimmermann | 49/324 |
| 2004/0036305 | A1 | | 2/2004 | Smith et al. | |
| 2006/0143868 | A1 | | 7/2006 | Bauer | |

* cited by examiner

*Primary Examiner*—Patricia L Engle
(74) *Attorney, Agent, or Firm*—Gifford, Krass, Sprinkle, Anderson & Citkowski, P.C.

(57) ABSTRACT

A retractable grip assist handle assembly provides an extendable support for a passenger during ingress to or egress from the vehicle. The retractable grip assist handle assembly includes a handle, and a body portion having a first end connected to the handle and the handle and body portion are extendable relative to the vehicle. A mechanical energy storage device is connected between a second end of the body portion and the vehicle. The mechanical energy storage device provides a return force that returns the handle to a retracted position from an extended position.

12 Claims, 3 Drawing Sheets

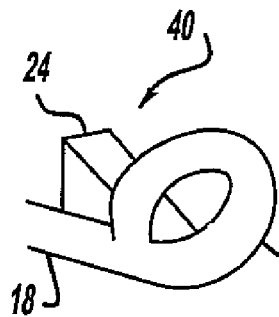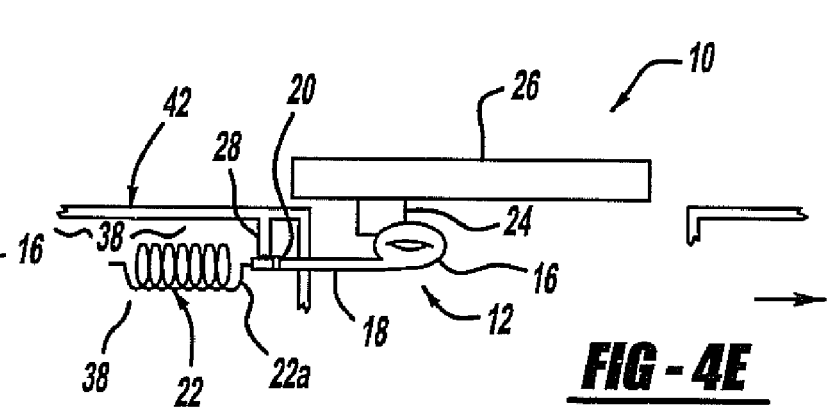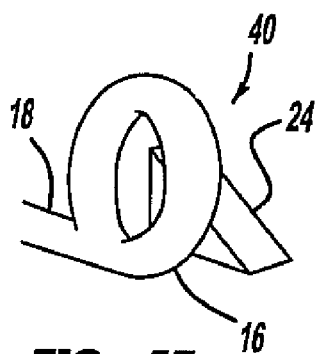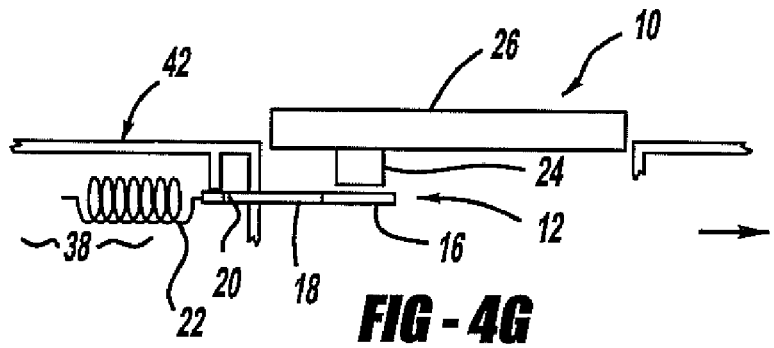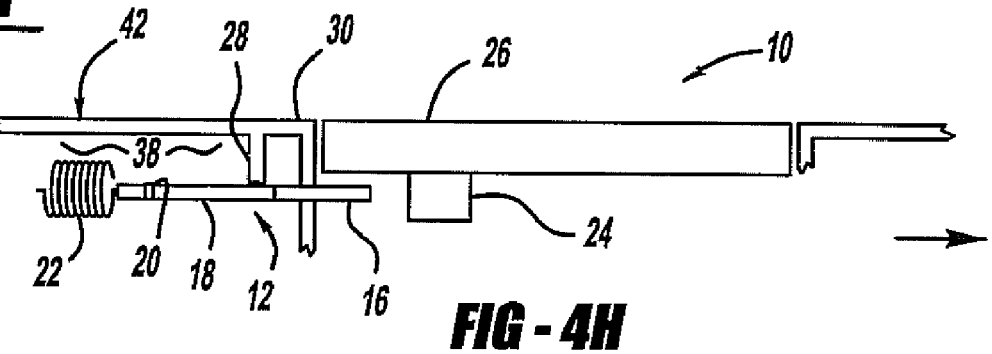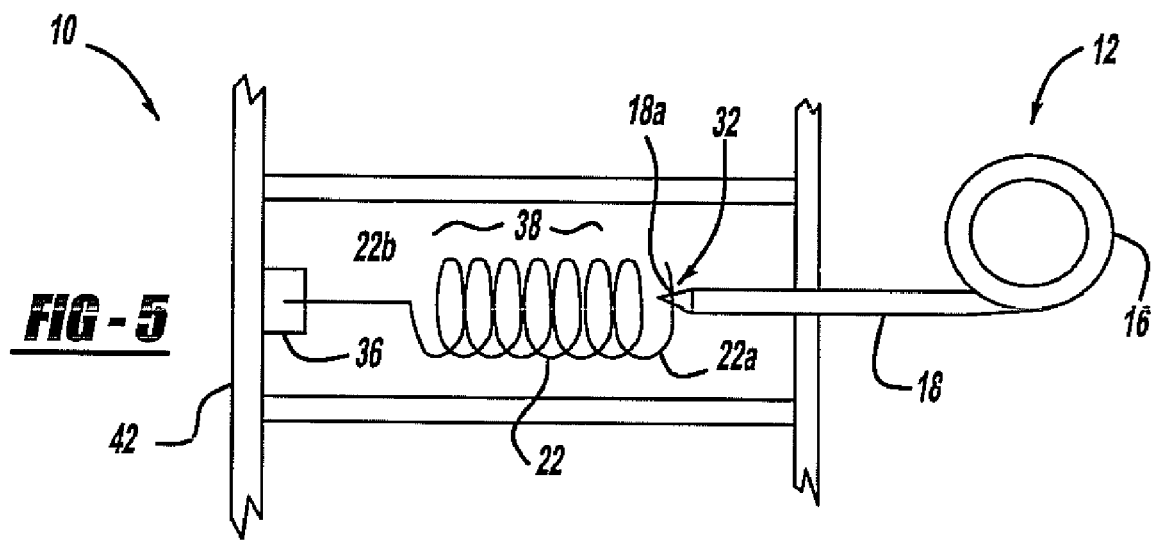

RETRACTABLE ASSIST HANDLE FOR A VEHICLE

BACKGROUND OF THE INVENTION

1. Field of the Invention

The present invention relates generally to an assist handle for a vehicle, and more particularly to a retractable assist handle for a vehicle.

2. Description of the Related Art

A passenger of a vehicle, such as a motor vehicle, may need to hold onto a portion of the vehicle for support during ingress into the vehicle or egress from the vehicle. The need for support may occur under a variety of circumstances, such as due to the size of the passenger relative to the height of the vehicle from the ground, or the dexterity or physical ability of the passenger. To accommodate the various types of passengers, vehicles typically include strategically placed handles for the passenger to grip upon entering or leaving the vehicle. For example, a handle may be located on a pillar, or on a seat or another portion of the vehicle. While these handles work well, they may be stationary, or may not be accessible to the user, or they may interfere with ingress to and egress from the vehicle. Thus, there is a need in the art for a retractable grip assist handle that has a more ergonomic placement, and does not interfere with ingress to and egress from the vehicle.

SUMMARY OF THE INVENTION

Accordingly, a retractable grip assist handle is provided that includes an extendable support for a passenger during ingress to or egress from the vehicle. The retractable grip assist handle assembly includes a handle, and a body portion having a first end connected to the handle, and the handle and body portion are extendable relative to the vehicle. A mechanical energy storage device is connected between a second end of the body portion and the vehicle. The mechanical energy storage device provides a return force that returns the handle to a retracted position from an extended position.

One advantage of the present invention is that retractable grip assist handle is provided that can be ergonomically located on the vehicle. Another advantage of the present invention is that the retractable grip assist handle retracts when not in use, so that it does not interfere with ingress to and egress from the vehicle. Still another advantage of the retractable grip assist handle is that it can be extended by the passenger for balance or support, and automatically returns when released. A further advantage of the present invention is that the retractable grip assist allows the passenger to push the grip assist in a multiple directions. Yet a further advantage of the present invention is that the positioning of the grip assist handle enhances the appearance of the interior of the vehicle.

BRIEF DESCRIPTION OF THE DRAWINGS

FIGS. 4d and 4e are another side view of the grip assist handle in a partially retracting position, according to the present invention.

FIGS. 4f and 4g are still another side view of the grip assist handle in a partially retracting position, according to the present invention.

FIG. 4h is a further side view of the grip assist handle in a retracted position, according to the present invention.

FIG. 5 is a top view of the grip assist handle in a retracted position, according to the present invention.

DETAILED DESCRIPTION OF THE PREFERRED EMBODIMENTS

Figure 1:
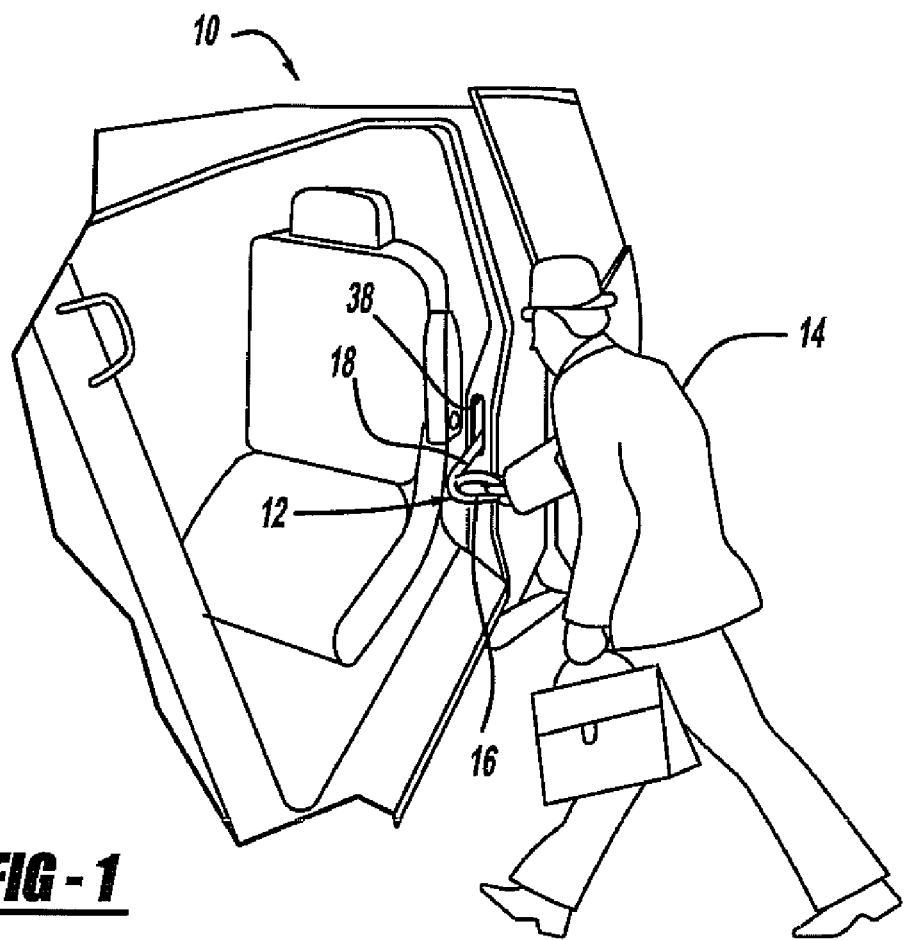
FIG. 1 is an elevational view of an interior portion of a vehicle, according to the present invention.
Figure 2:
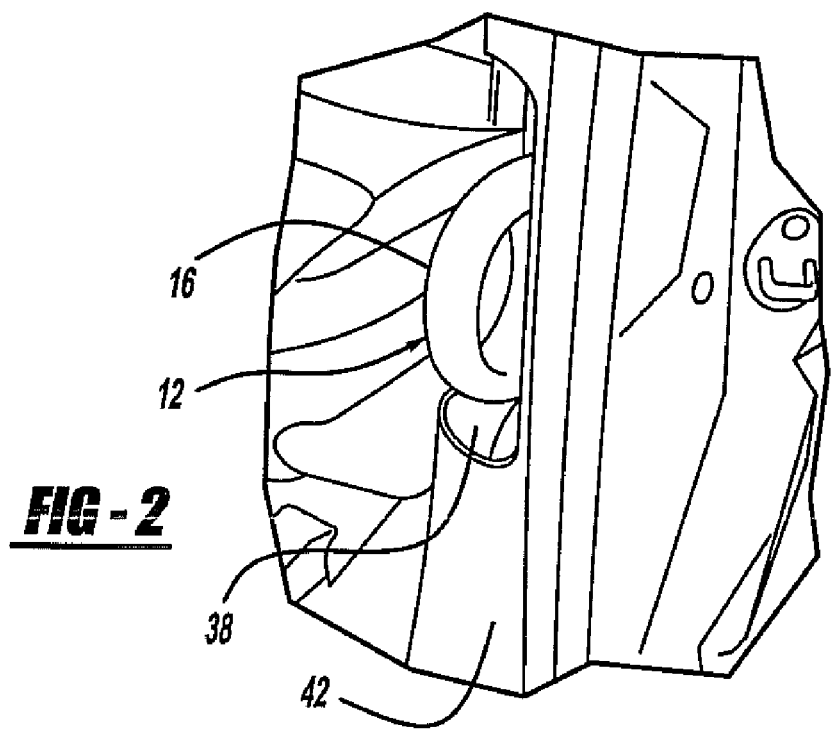
FIG. 2 is an enlarged view of a retracted grip assist handle for the vehicle of FIG. 1, according to the present invention.
Figure 3:
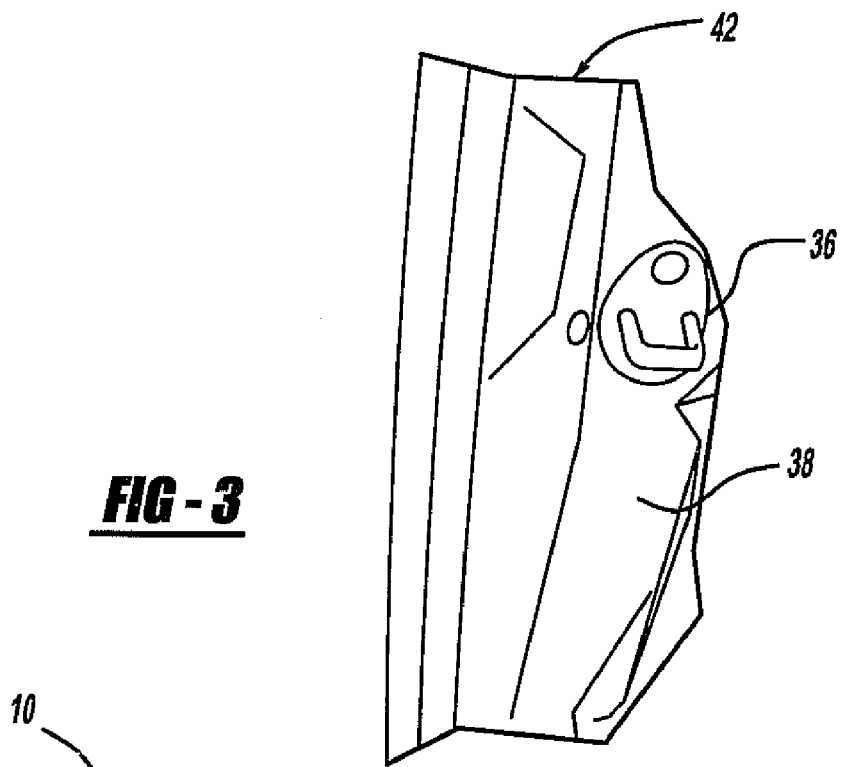
FIG. 3 is a view of an attachment means for the grip assist handle to the vehicle, according to the present invention.

Referring to FIGS. 1-5 a retractable grip assist handle assembly 12 for a vehicle 10 is illustrated. The grip assist handle assembly 12 is ergonomically positioned on the vehicle 10 for access by a passenger 14. The grip assist handle 12 provides the passenger 14 with support during ingress to or egress from the vehicle 10. The availability of a support assists in maintaining the balance of the passenger 14 during such movement. The grip assist handle assembly 12 is located within the vehicle structure 42 where it is readily accessible, such as on a pillar portion, or a seat portion, or a floor portion, or a trim portion or the like. It should be appreciated that the grip assist handle assembly 12 is supported within a cavity 38 formed in the vehicle 10, in a manner to be described.

The retractable grip assist handle assembly 12 includes a handle 16. In this example, the handle 16 has a ring shape, although other shapes are available. The choice of handle 16 shape may be aesthetic or functional, and may further depend on the location of the grip assist handle 16 and available space. The grip assist handle 16 may be fabricated from a variety of suitable materials, such as plastic or metal or the like. It should be appreciated that in a retracted position, only the handle portion 16 of the assembly 12 is visible to the occupant, and the rest of the assembly is located within the cavity 38 formed in the vehicle 10.

The grip assist handle 16 is attached to a body portion 18. In this example, one end of the body portion 18 is integrally connected to the handle 16. Further, in this example, the body portion 18 has a generally tubular shape. The body portion 18 includes a radially projecting stop 20 integrally formed therein. The stop 20 is located a predetermined distance along the length of the body portion 18 from the handle 16. The stop 20 may have several functions. For example, the stop 20 may limit the distance the handle can be retracted or extended. The stop may prevent the body portion 18 from extending outside of the cavity 38 formed in the vehicle structure 42. The vehicle structure 42 may also include a leg member 28 extending into the cavity 38 that the stop "catches" on in order to hold the grip assist handle assembly 12 in an extended position. It should be appreciated that a passenger 14 may rotate the handle while extending it, such as to a horizontal orientation, so that the body portion stop 20 catches on and is held by the body panel extension 28. The location of the stop 20 is variable, and depends on features such as the length of the body portion 18, or the corresponding vehicle structure 42 or the like.

The opposite end of the body portion 18 is operatively attached to a mechanical energy storage device 22, such as a spring. In this example, the spring 22 is an extension spring. A first end of the spring 22 is operatively connected to the body portion 18, and a second end of the spring 22 is operatively connected to the vehicle structure 42. Various types of connecting means 32 are contemplated, such as a hook and eye connection, a weld connection, a snap-fit connection or the like. Further, more than one connection method may be utilized. In this example, the first end of the spring 22 includes a hook 22a and the second end of the body portion 18 includes an aperture 18a or eye portion for receiving the hook portion 22a of the spring. Further, the second end of the spring 22 may be connected to the vehicle 10 using a connecting means 32. The second end of the spring may include a hook portion 22b that is secured to a retaining member 36 integral with the vehicle 10. In this example, the retaining member 36 has a "U" shape, and the ends of the "U-shaped" member are permanently secured to the vehicle, using a technique such as welding, bolting, bonding or the like. The connecting means 32 may permit the handle 16 and body portion 18 to rotate, in a mariner to be described.

Figure 4A:
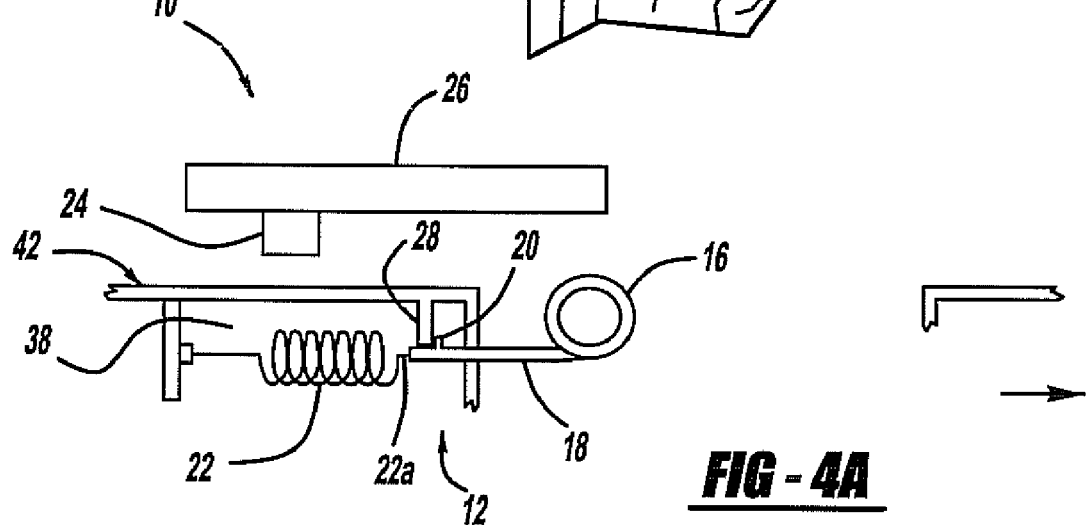
FIG. 4a is a side view of the grip assist handle in an extended position, according to the present invention.
Figure 4B:
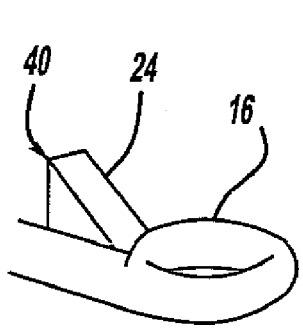
FIGS. 4b and 4c are another side view of the grip assist handle in a retracting position, according to the present invention.
Figure 4C:
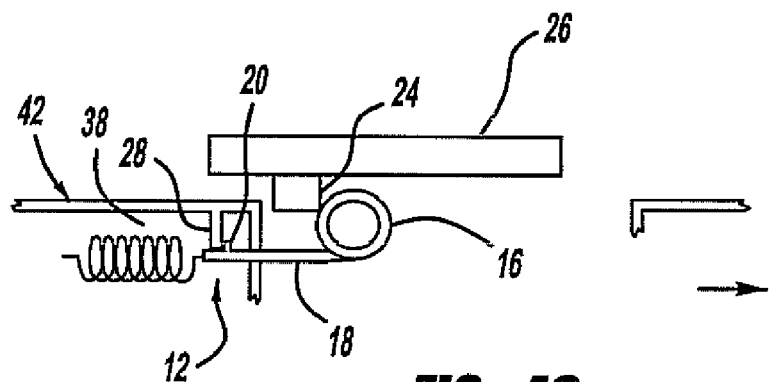

The grip assist handle assembly 12 may include an automatic handle return means 40 for returning the handle 16 to a retracted position as a result of closing the door 26. In this example, the door 26 of the vehicle includes a door member 24 projecting outwardly from an inner surface of the vehicle door 26. The door member 24 has a suitable shape, such as the wedge shape of this example. The door member 24 is positioned on the door 26 in a location corresponding to the position of the handle 16. The contact of the handle 16 with the door member 24 as a result of closing the door 26 operatively returns the grip assist handle assembly 12 to a retracted position. As progressively shown in FIGS. 4a-4h, the passenger lets go of the extended handle 16, and the spring 22 exerts a return force on the handle 16 causing the handle 16 to move in a retracting direction until the body portion stop 20 contacts the leg member 28 in the cavity 38 of the vehicle structure. The passenger then closes the door, and the door member 24 contacts the handle 16. The continued contact of the handle 16 along the inclined surface of the door member 24 causes the handle 16 to rotate about a central axis of the body portion 18. The handle 16 rotates about 90 degrees in this example. The rotation of the body portion 18 about its axis displaces the stop 20 from its position against the leg member 28, so that the handle 16 can be returned to a fully retracted position as shown in FIG. 4h.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

The invention claimed is:

1. A retractable grip assist handle system for a vehicle that moves between an extended position and a retracted position, said grip assist handle comprising:
   a door coupled to the vehicle;
   a door member projecting from said door;
   a handle having a body portion having a first end connected to said handle wherein said handle and said body portion are extendable relative to the vehicle, said body portion further having a surface;
   a leg member mounted to the vehicle or the handle;
   a stop projecting from said surface of said body portion or from the vehicle for holding said body portion in an extended position;
   a mechanical energy storage device connected between a second end of said body portion and the vehicle, wherein said mechanical energy storage device returns said handle from an extended position to a retracted position;
   wherein as the vehicle door is closed, contact between the door member and said handle rotates said handle to disengage said stop from said leg member, and the grip assist handle returns to the retracted position.

2. The grip assist handle of claim 1 wherein said handle is annular.

3. The grip assist handle of claim 1 wherein said body portion is tubular in shape.

4. The grip assist handle of claim 1 wherein said mechanical energy storage device is an extension spring.

5. The grip assist handle of claim 1 wherein said handle and said body portion are integral and formed as one member.

6. A retractable grip assist handle for a vehicle that moves between an extended portion and a retracted position, said grip assist handle comprising:
   a handle;
   a body portion having a first end connected to said handle arid said handle and said body portion are extendable relative to the vehicle, wherein said body portion includes a stop projecting from a surface of said body portion for holding said body portion in an extended position;
   a spring connected between a second end of said body portion and the vehicle; and
   a handle return, wherein the handle return includes a door member projecting from a door of the vehicle, so that as the door is closing, contact between the door member and said handle rotates said handle to disengage said body portion stop from a leg member in the vehicle structure, and the grip assist handle returns to the retracted position.

7. The grip assist handle of claim 6 wherein said handle is annular.

8. The grip assist handle of claim 6 wherein said body portion is tubular in shape.

9. The grip assist handle of claim 6 wherein said spring is an extension spring.

10. The grip assist handle of claim 6 wherein said handle and said body portion are integral and formed as one member.

11. A retractable grip assist handle assembly for a vehicle, said grip assist handle assembly comprising:
   a door mounted to a vehicle, said door having a door member projecting from said door;
   a handle movably mounted to a vehicle structure adjacent said door, said handle movable in a direction parallel with a longitudinal axis of the vehicle between an extended position and a retracted position within said vehicle structure, said handle rotatable about a central axis which is coplanar with said longitudinal axis; and
   a spring extending between said handle and said vehicle;
   wherein contact between said door member and said handle rotates said handle 90° about said central axis of said handle thereby moving said handle to the second retracted position.

12. The grip assist handle of claim 11 wherein said spring is an extension spring.

* * * * *

UNITED STATES PATENT AND TRADEMARK OFFICE
CERTIFICATE OF CORRECTION

PATENT NO.        : 7,744,141 B2
APPLICATION NO.   : 11/624473
DATED             : June 29, 2010
INVENTOR(S)       : Katsuhiro Saionji et al.

It is certified that error appears in the above-identified patent and that said Letters Patent is hereby corrected as shown below:

Column 3 line 14 replace "mariner" with --manner--

Column 4 line 22 replace "arid" with --and--

Signed and Sealed this

Thirtieth Day of November, 2010

David J. Kappos
*Director of the United States Patent and Trademark Office*